May 19, 1953 J. H. BRADFORD 2,639,132
PROCESSING FURNACE FOR DISCRETE SOLIDS
Filed Aug. 13, 1948 2 Sheets-Sheet 1
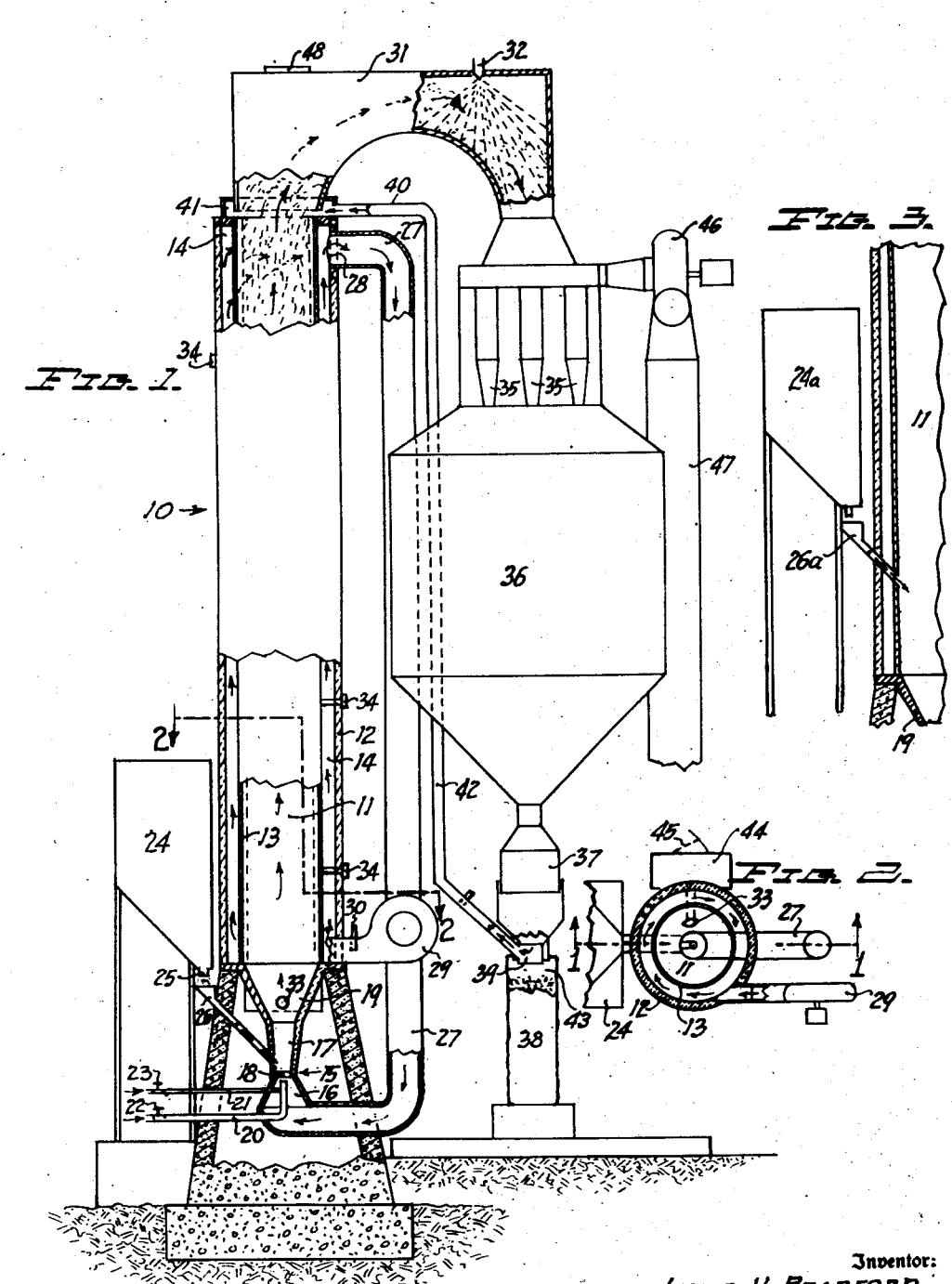
Inventor:
JAMES H. BRADFORD,
Attorneys.

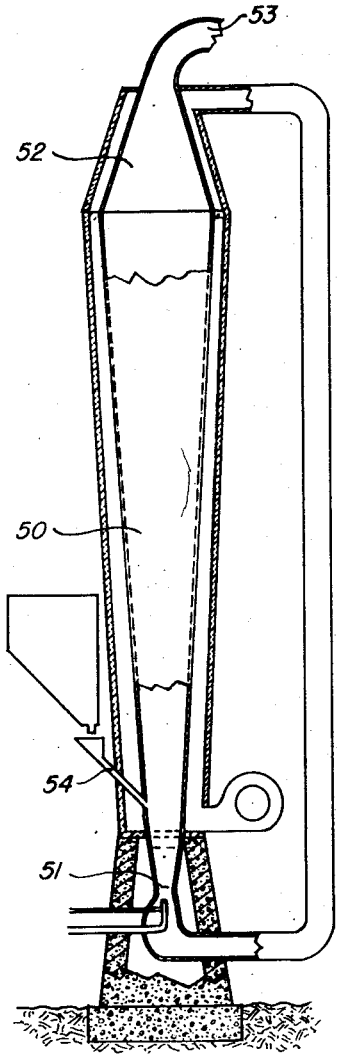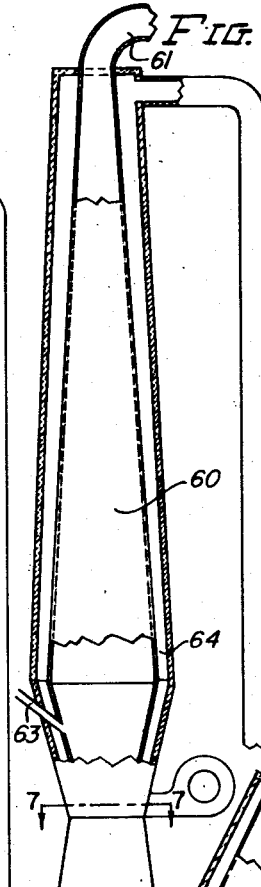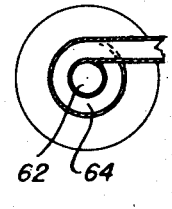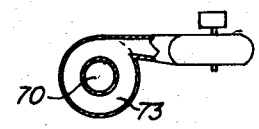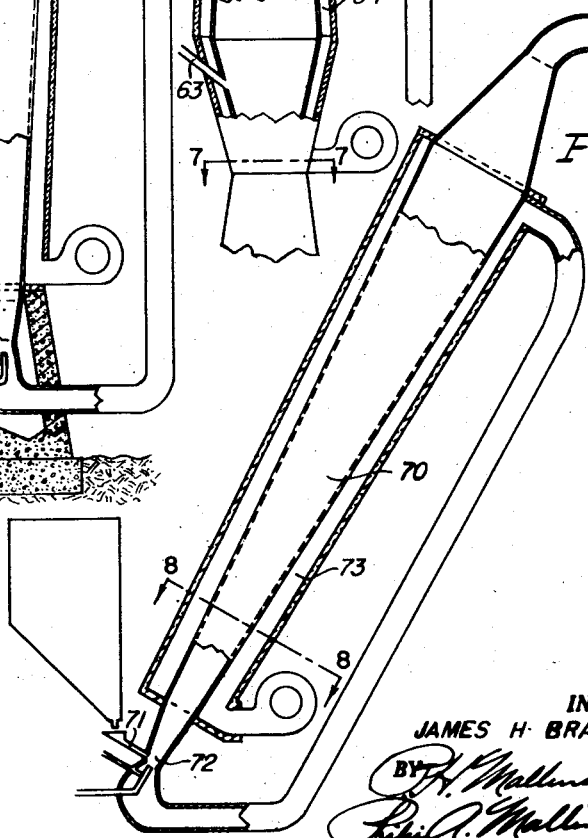
INVENTOR.
JAMES H. BRADFORD
ATTORNEYS Patented May 19, 1953

2,639,132

UNITED STATES PATENT OFFICE 2,639,132

PROCESSING FURNACE FOR DISCRETE SOLIDS

James H. Bradford, Tooele, Utah, assignor of one-half to Combined Metals Reduction Company, a corporation of Utah Application August 13, 1948, Serial No. 44,194

11 Claims. (Cl. 263—21)

This invention relates to a processing furnace for discrete solids, to effect chemical or physical changes therein.

The principal objects and features of the invention are readily ascertained from the following introductory paragraphs.

The solids, as prepared for heat treatment, are preferably in a finely divided or discrete form suitable for thorough mixing with a gaseous medium. The desired chemical or physical changes are effected easily, rapidly, and efficiently under relatively close temperature regulation. Many desirable metallurgical and chemical results that heretofore have been attained only with difficulty or not at all become easily and economically attainable. For example, perlite ore is efficiently expanded to many times its original volume, forming a fluffy, light-weight product suitable for insulation purposes, without undesirable adhesion to the walls of the processing vessel; lime rock is calcined to form various grades of lime in a most expeditious manner; gypsum is "cooked" to form plaster of Paris; iron oxide ore is reduced to form sponge iron; while sulphide ores are effectively roasted to form oxides. Various well known chemical and metallurgical processes may be greatly simplified and rendered less expensive by the use of the invention.

Preferred apparatus of the invention includes a reaction chamber, that is to say, a combustion and reaction shaft, defined by a confining shell, through a bottom firing orifice of which atomized fuel is introduced, together with a forced draft of air, in a way serving to hold a body of finely divided solids in suspension in transit through the chamber. Included also is means for feeding the finely divided solids into the stream of atomized fuel, as well as means for discharging the resulting reaction products.

The reaction chamber or shaft is preferably tubular and extends upwardly. It is advantageously enclosed, but not necessarily so, in an air jacket formed by an insulating wall, spaced apart from the defining shell. The defining shell is heat conductive, so that cooler air circulated through the air jacket, or merely against the exterior wall surfaces of the shell where no air jacket is provided, abstracts heat from the walls of the chamber.

The fuel used for heating may be a gas, a liquid, or a solid. If solid fuel is used, it is desirable that it be in a finely divided form so as to be thoroughly mixed with the material under treatment. As a rule, the mixture of material and finely divided solid fuel is blown into the furnace with compressed air so as to form a suitable jet. In any event the fuel mixture is atomized as it is introduced into the chamber.

The particular shape of the furnace depends largely on the materials to be treated. In certain instances it is uniformly circular in cross-section, extending substantially vertically to a suitable height. In other instances it is desirable that the diameter be varied so the reaction chamber either diverges or converges, as the case may be, from the bottom towards the top, preferably at a substantially uniform rate.

The upwardly diverging chamber or tube is suitable for treating materials that expand when subjected to the proper heat. Examples of such materials are perlite, vermiculite, certain types of clays, slags, pumice, slate, and various synthetic mixtures. This type of chamber or tube may also be used for materials which become lighter in weight when subjected to heat, an example being finely divided coal in the process of coking.

The upwardly converging chamber or tube is suitable for materials which become heavier after exposure to a proper degree of heat.

In cases where the material under treatment requires approximately the same gas velocity both before and after treatment, it is desirable that the reaction chamber or tube be of substantially uniform diameter at all points.

One or another of the different types of reaction chambers is useful in the roasting of sulphide ores, calcining of ores and rock material, coking of coal, cooking gypsum and dehydrating materials in general, reduction of ores to the metallic state, transformation of sulphates into sulfides, oxidation of materials such as converting litharge into red lead, etc.

Since the furnace of the invention is particularly suited to the popping of perlite, and since this use is generally typical, the following description is directed thereto.

In the popping of perlite, that is to say, in the heat-treating of perlite rock particles to convert the water of crystallization thereof to steam at the same time the rock is plastic, so that porous, light weight particles result, it is imperative that the furnace wall be kept at a temperature below that prevailing in the burning zone of the furnace, to thereby prevent fusion on the furnace wall of material under treatment. This is accomplished, pursuant to the invention, by dissipating sufficient heat directly from the reaction chamber wall so as to lower the temperature thereof the desired amount.

In processing raw perlite material, rapid heating is essential for producing the best grade of the finally expanded perlite product. This is particularly true for perlite particles of larger sizes. As a matter of fact, if the perlite particles are not heated rapidly to the fusing temperature, they fracture and consequently release the contained chemical water without expanding the particles to any appreciable extent. In the case of the smaller particles, these are shattered unless rapid heating takes place. On the other hand, if the particles are heated with sufficient rapidity, they become fused or semiplastic, and the chemically combined water or contained gases cause the particles to expand to many times their original size, and at the same time cause the surfaces of the plastic particles to become glazed and sealed. Having the surfaces of the finished particles sealed is important, since it enhances the insulating value of the finished product and decreases the possible water absorption. When the product is used as an aggregate with Portland cement, it produces a strong, lightweight concrete because of the lower ratio between the cement and water used.

In accordance with the invention, the crushed perlite ore is fed to the furnace in such a way that it becomes thoroughly dispersed in the flame, thereby bringing about the most rapid and efficient heating of the perlite particles. These perlite particles are automatically held in the furnace until fully popped. In most instances, the discrete raw material enters the furnace at the lower end of its shaft, which is preferably vertical, the velocity of the incoming mixed fuel and air being so regulated as to carry upwardly with it to the top of the furnace shaft only those particles that have been properly popped. Any partially popped particles are held in suspension in the ascending flame until the desired popping is completed. The exhaust gases, accompanied by the popped particles, emerge at the top of the furnace and are conducted to a point where the popped articles are cooled to the desired temperature, as, for example, by means of a fine spray or fog of water. The finished perlite particles are deposited in a bin or other container, while the exhaust gases are conducted to a suitable point of of discharge.

It is to be noted that any gangue material contained in the discrete raw perlite ore, which does not pop, is discharged at the bottom of the furnace shaft and disposed of as waste.

The velocity of a fluid mixture flowing through a forced blast burner which is preferably of Venturi type at the lower end of the reaction chamber, must be sufficient to keep the desired solids fed to the furnace, in suspension. Thus suspended, the solid particles are transported up, into, and through the reaction chamber or zone. Obviously, delicate regulation of the forced blast and of fluid entering the Venturi throat must be maintained in accordance with the different sizes of material fed to the furnace.

By means of the Venturi burner the discrete particles are thoroughly mixed with the flowing gaseous medium, and as both travel in the same direction, the particles are subjected to the action of the gases for maximum periods of time. This feature facilitates popping of perlite in reaction chambers of practically any shape.

The mesh to which the feed is sized determines the temperature of operation of the furnace. The finer the mesh, the lower the operating temperature. Careful attention to this feature prevents formation of fused masses in the lower part of the reaction chamber.

In the accompanying drawings, which are largely in diagrammatic form and which illustrate several desirable embodiments of the invention:

Fig. 1 represents a front elevation, partially in vertical section taken on line 1—1 in Fig. 2, the reaction chamber in this embodiment being of substantially uniform cross-section from bottom to top;

Fig. 2, a horizontal cross-section taken on the line 2—2 in Fig. 1;

Fig. 3, a fragmentary portion corresponding to Fig. 1, but showing a difference in arrangement;

Fig. 4, a front elevation, partially in section, of an arrangement where the wall of the reaction chamber diverges from bottom to top;

Fig. 5, a corresponding view of an arrangement where the wall of the reaction chamber converges from bottom to top;

Fig. 6, another corresponding view of an arrangement similar to the one shown in Fig. 4, but with the difference that the entire furnace is inclined sufficiently so that material in the reaction chamber will be caused to slide on a surface having an inclination somewhat greater than the angle of repose; and, Figs. 7 and 8, cross-sections taken respectively on the lines 7—7 and 8—8 in Fig. 5.

Referring to the drawings: the numeral 10 designates a furnace, having in this instance a substantially vertical reaction shaft or chamber 11 defined by a shell 13. Such shell 13 is preferably tubular, and made of material having good refractory and heat-conductive properties. I have found stainless steel to be an excellent material for this purpose. An enclosing wall 12, is made of material having good heat-insulating qualities, is spaced around the shell 13, preferably concentrically therewith as illustrated.

The space 14 between the shell 13 and the insulating wall 12 forms virtually an air jacket through which air is controllably circulated for the purpose of cooling the shell 13 of the reaction chamber to a temperature such that the material being processed will not fuse on the inside surface thereof.

Firing of the furnace is preferably effected through a Venturi tube, which forms a burner 15 and consists of two truncated hollow cones 16 and 17 connected to each other by a short cylindrical portion 18 forming the throat of the Venturi tube. Connecting the cone 17 to the reaction chamber 11 in the present instance is a truncated, hollow, conical junction member 19, which provides a divergent entry to the reaction chamber from a centrally disposed firing orifice provided by the upper end of the portion 17 of burner 15. As illustrated, the divergency of such entry is gradual longitudinally of the reaction chamber to insure complete firing coverage of said reaction chamber and no static areas for deposition and collection of material being processed. Thus, in effect, the divergent entry becomes part of the reaction chamber. Leading into the cone 16 at a point in proximity to the throat 18 is a conduit 20 for compressed air that originates at a suitable source of supply (not shown). Another conduit is provided at 21 for bringing oil or other fuel to the burner. Flow through conduits 20 and 21 is controlled by suitable means, such as the respective valves 22 and 23.

In operation, crushed material to be processed is delivered into a supply bin or hopper 24 from which the material is fed through a regulatable orifice 25 into and through a funneled spout 26 that enters the Venturi burner 15 at a suitable point above the inner terminus of compressed-air conduct 20. Air for combustion is delivered into Venturi burner 15 by means of a conduit 27 that is preferably in communication at 28 with the upper part of the air jacket 14. A blower 29 having an air discharge which is regulated by a gate 30 forces the air into the lower part of air jacket 14, thereby controllably causing the circulation of air through jacket 14 and through conduit 27 into and through Venturi burner 15. The air from blower 29 enters the jacket 14 preferably tangentially, thereby causing the current to travel upwardly through the jacket along substantially helical paths. The upper part of the reaction chamber 11 is in communication with a cooling chamber 31 into which extends a water spray pipe 32 the purpose of which will presently appear.

Assuming fuel, such as oil, to be controllably flowing in through conduit 21 and meeting a controlled flow of compressed air coming through a conduit 20, the result will be the controlled forcible spraying of an atomized, combustible, fluid current through the Venturi burner 15. This combustible current is initially ignited through an opening 33 providing access from the outside, and creates a hot blast blowing upwardly through the reaction chamber 11. Processing is begun by feeding the crushed raw material from bin 24 through the controlled orifice 25 and spout 26 into the aforesaid blast. Pyrometers 34 or other temperature indicating devices, are strategically placed in different parts of the reaction chamber in any well known manner so as to indicate what is taking place within the chamber.

Processed material, consisting in the case of perlite, of expanded particles accompanied by waste gases, flows through the water spray for cooling. The water spray is so regulated that substantially no moisture is left adhering to the finished particles. This is conditioned on the proposition that the expanded material contains a sufficient residue of heat to dry off the cooling moisture and that the control of the spray is so regulated as to be not excessive.

The dry product may be passed through any suitable dust-collecting apparatus, such as the plurality of cones 35, and deposited in a storage bin 36. From this bin the material is drawn into any suitable receptacle, such as a measuring box 37, from which sacks, such as 38, may be filled through a discharge valve 39.

It is frequently desirable that means be provided for bleeding air into the upper part of the reaction chamber 11. An advantageous arrangement consists of a bustle pipe 40, which is in communication with the chamber 11 through a space 41. A further advantage is to connect the bustle pipe 40 through a dust conduit 42 with the measuring box 37. Thus, when air is drawn through conduit 42, any dust in the bag space 43 is removed and put back into circulation.

An alternative feed hopper position 24a, Fig. 3, indicates the introduction of raw material directly into the reaction chamber 11 at any suitable point above junction member 19.

The substance of the invention is directed particularly to the treatment of solids with the proper proportions of gaseous reagents or gaseous medium to bring about chemical reactions or physical changes under the most favorable conditions.

One condition is that finely divided material, such as perlite ore, is fed into a stream of combustible gas or gases and thoroughly and uniformly mixed therewith, after which the combustibles are ignited, with the result that the flame is propagated in the reaction chamber. This condition exists in using apparatus of Fig. 1. The fact that the velocity of the mixture within the Venturi burner is high, is unfavorable to both ignition and flame propagation. Therefore ignition takes place after the mixture passes somewhat beyond the mouth of the burner where the velocity reduces in the upwardly divergent passage through junction member 19 until the entrance to the reaction chamber is reached, at which point the velocity tends to become uniform and so is favorable to flame propagation through this chamber.

The divergent passage accomplishes another important condition, namely, that any solid particles that tend to settle out of the reaction chamber, encounter the differential velocities in the divergent passage. Such encounter means that as soon as a velocity is reached that overbalances the specific gravity of such a particle, that particle will again be urged upwardly into the reaction chamber with the possibility of being carried onward by contact with other particles. It may also happen that a certain attrition of the settled-out particle reduces its surface of contact whereby its coefficient of suspension in the gaseous stream is increased.

In the construction of Fig. 3, any material being processed is not necessarily mixed with the combustion gas or gases until ignition of the latter.

The opening 33, Fig. 1, serves as a waste exit for foreign particles that tend to settle out of any ascending mass without being susceptible to the pick-up action thereof as just described.

Sometimes it is desirable to provide a closed waste compartment 44 into which opening 33 leads. Any accumulated waste is removed from compartment 44 at convenient intervals through a door 45, Fig. 2.

An exhaust fan at 46 facilitates removal of dust from cones 35 and at the same time creates a suction in cooling chamber 31, thereby bleeding air through dust conduit 42 as previously mentioned. The exhaust fan discharges its dust into a bag 47.

An inspection door is provided at 48 which also serves as a relief valve in the event an explosion of gas should occur in the reaction chamber 11.

The construction illustrated in Fig. 4 exemplifies those forms of the invention wherein the reaction chamber diverges upwardly from the bottom thereof. As illustrated, the tubular reaction chamber 50 diverges upwardly from the Venturi throat 51 to a height predetermined by the material and condition of treatment whereupon it diverges, forming in effect an offtake hood 52 leading to a discharge conduit 53. In this instance the discrete material to be processed passes directly into the lower part of the reaction chamber 50 through a gravity chute 54. As in the prior construction, an air jacket 55 advantageously surrounds the reaction chamber shell in spaced relation thereto.

In Figs. 5 and 7 the reaction chamber 60 converges to a discharge conduit 61 from the flared portion 62 above the Venturi burner. The discrete material enters such flared portion by way of a gravity chute 63.

The furnace of Figs. 6 and 8 is generally similar to that of Fig. 4, but is inclined at an angle to the vertical, so that the discrete material is exposed to the processing treatment for a longer period of time. The angle of incline is somewhat greater with respect to the horizontal and somewhat less with respect to the vertical than the normal angle of repose of the material being treated. Accordingly, there is no static piling of material on the lower wall of the reaction chamber 70. In the illustrated arrangement, feed chute 71 introduces the discrete material to be treated, directly into the Venturi throat 72, and an air jacket 73 serves to abstract heat from the tubular shell.

In the processing of most grades of perlite the mean temperature of the column of ascending, flaming material is maintained at approximately 1000° C., which brings about the desired degree of popping and surface fusion of the particles. Abstracting from the walls of the reaction chamber sufficient heat to reduce the temperature by approximately 20° C. will ordinarily accomplish the purposes of the invention as hereinbefore outlined.

While it is usually advantageous to provide an insulating wall in externally spaced relationship to the heat conductive walls of the confining shell which defines the reaction chamber, so as to produce a definite air jacket about such shell in the manner illustrated, that is not always necessary. The desired results may be satisfactorily achieved in many instances by merely installing the shell in the open where natural circulation is sufficient to effect the desired abstraction of heat, or a forced blast of air may be directed across the naked shell.

The means for injecting discrete material into the furnace is here illustrated as a gravity chute. While this effects advantageous results in many instances so far as uniformity of distribution of the material in the ascending stream of fluid is concerned, other injecting means, such as a worm feed, may be utilized in some cases with generally satisfactory results.

Additional forms of apparatus conforming generally to this invention are disclosed and claimed specifically in my copending application for Patent Serial Number 166,170, filed June 5, 1950, entitled "Method of Heat Processing Finely Divided Materials and Furnace Therefor," and the burner per se is set forth and claimed specifically in my copending application Serial Number 249,660, filed October 4, 1951, entitled "Material Mixing Burner for Processing Furnaces."

Whereas this invention is here illustrated and described with respect to several preferred forms thereof, it should be understood that various changes may be made therein and various other constructions may be produced on the basis of the teachings here of by those skilled in the art without departing from the scope of the invention. In my copending application Serial 166,170, filed June 5, 1950, entitled "Method of Heat Processing Finely Divided Materials and Furnace Therefor," I have shown certain processing furnace constructions which differ in some respects from those here shown but which conform to the generic teachings and claims hereof.

What is claimed is:

1. Processing apparatus, comprising a substantially vertical tubular shell defining therein a reaction chamber of given cross-sectional area; a Venturi-tube burner, having a discharge mouth of less than the given cross-sectional area, in communication with said reaction chamber; means defining an air jacket around said tubular shell; a circulator for propelling cooling air into, through, and out of said air-jacket; a source of fluid fuel supply leading into said burner; and means for supplying material to be processed in said reaction chamber.

2. Processing apparatus according to claim 1 wherein said tubular shell is made of stainless steel.

3. Apparatus for processing discrete material, comprising a tubular shell of heat-conductive material defining an upwardly-extending furnace reaction chamber having an inlet at its lower end and an outlet at its upper end; means defining a Venturi throat below the entrance to said chamber at its lower end; conduit means for combustion-supporting fluid connected with the lower end of said Venturi throat; a fuel injecting nozzle directed upwardly of said Venturi throat and arranged to discharge a blast of atomized fuel thereinto and on into said reaction chamber, acompanied by the inspiration of combustion-supporting fluid from said conduit means; feed means for discrete material located at a point above the fuel injecting nozzle so as to introduce material to the fluid stream in a manner whereby said discrete material will be thoroughly and substantially uniformly mixed with said fluid as it ascends within said tubular shell; a wall surrounding said tubular shell in spaced relationship therewith to form an air-jacket; and means for circulating cooling air through said air-jacket.

4. Apparatus for processing discrete materials, comprising walls defining a substantially vertically disposed and elongate furnace reaction chamber having a discharge at its upper end for the reaction products, said walls having good heat-conductive properties; heat-insulating walls spaced apart from and enclosing said reaction chamber walls to form an air-jacket substantially completely therearound; an air inlet to said air-jacket; an air outlet from said air-jacket spaced apart from said air inlet longitudinally of said jacket; a forced blast burner at the lower end of said reaction chamber, including an air inlet and admission nozzling for combustible fluid; an inlet to said reaction chamber for discrete material to be processed, said inlet being disposed above said fluid admission nozzling; means for propelling air through said air-jacket; and walls defining an air channel from said outlet of the air-jacket to and substantially completely comprehending said air inlet of said forced blast burner, thereby establishing confined flow communication for air from said outlet of the air-jacket to said air inlet of the blast burner.

5. Apparatus for processing discrete materials, comprising walls defining an elongate furnace reaction chamber, said walls having good heat-conductive properties; heat-insulating walls spaced apart from and enclosing said reaction chamber walls to form an air-jacket substantially completely therearound; an air inlet to said air-jacket; an air outlet from said air-jacket spaced apart from said air inlet longitudinally of said jacket; a forced blast burner at one end of said reaction chamber, including an air inlet and admission nozzling for combustible fluid; an inlet to said reaction chamber for discrete material to be processed, said inlet being disposed beyond said fluid admission nozzling inwardly of said reaction chamber; discharge means at the opposite end of said reaction chamber for the reaction products; means for propelling air through said air-jacket; and walls defining an air channel from said outlet of the air-jacket to and substantially completely comprehending said air inlet of said forced blast burner, thereby establishing confined flow comunication for air from said outlet of the air-jacket to said air inlet of the blast burner.

6. Apparatus for processing discrete solid particles, comprising an elongate shell of heat-conductive material defining a furnace reaction chamber; a second shell embracing said heat-conductive shell in spaced relationship therewith to define an air-jacket substantially completely around the latter; means for passing cooling air into, through, and out of said air-jacket; a blast burner directed into one end of said reaction chamber; discharge means for reaction products at the other end of said reaction chamber; a feeder device for discrete solid particles, said feeder device having a discharge directed into the path of the blast of said burner, and means separating the discharge opening of said air-jacket from the discharge opening of said reaction chamber shell, so that there will be no mergence of the respective fluid streams issuing therefrom.

7. Heat processing apparatus for discrete solid particles, including, in combination, furnace structure defining an elongate, upwardly extending, combustion and reaction shaft having its lower end open; a substantially correspondingly upwardly directed, forced blast burner in the form of a Venturi tube having an upwardly convergent lower member and an upwardly divergent upper member interconnected by an intermediate throat member, the lower open end of the said lower member being open to a forced draft, and the upper open end of the said upper member being directed into the lower open end of said combustion and reaction shaft, whereby a particle-supporting blast is caused to pass upwardly throughout substantially the entire cross-sectional area of said burner and into and through said combustion and reaction shaft; an upwardly divergent junction member interconnecting the said upper open end of the upper member of said burner with the said lower open end of the combustion and reaction shaft, to provide an ignition and initial combustion zone for the said furnace structure; means for effecting a forced draft through the said lower open end of the lower member of the burner; pressure fuel supply means below said throat member for injecting fuel upwardly within said burner; and a feeder for the discrete solid particles to be processed, said feeder having a discharge directed into the path of said blast.

8. The combination recited in claim 7, wherein the furnace structure includes the upwardly divergent junction member at its lower end, defining the lower portion of the combustion and reaction shaft, and providing at its lower end an opening with which the firing orifice of the Venturi tube is in registry.

9. The combination recited in claim 7, wherein the feeder for the solid particles to be processed comprises a feed conduit entering the upwardly divergent upper member of the Venturi tube.

10. Apparatus for processing discrete solid particles, comprising an elongate shell of heat-conductive material defining a furnace reaction chamber having its opposite ends open for firing and for discharge, respectively; a second shell embracing said heat-conductive shell in spaced relationship therewith to define an air-jacket substantially completely around the latter, said air-jacket being open adjacent opposite ends thereof for the passage of air; means for passing cooling air into, through, and out of said air-jacket; a blast burner directed into the firing end of said reaction chamber; discharge means for reaction products at the other end of said reaction chamber; means for feeding discrete solid particles into the blast of said burner; and wall means closing off and separating the discharge end of said reaction chamber from the adjacent open end of said air-jacket, so that there will be no flow intercommunication between the two.

11. Apparatus as defined in claim 10, wherein the blast burner is of Venturi-tube formation.

JAMES H. BRADFORD.

References Cited in the file of this patent

UNITED STATES PATENTS

| Number | Name | Date |
|---|---|---|
| 212,508 | Robinson | Feb. 18, 1879 |
| 920,334 | Hughes | May 4, 1909 |
| 1,173,188 | Hetherington | Feb. 29, 1916 |
| 1,513,622 | Manning | Oct. 28, 1924 |
| 1,827,144 | Engel | Oct. 13, 1931 |
| 2,300,042 | Caldwell | Oct. 27, 1942 |
| 2,421,902 | Neuschotz | June 10, 1947 |
| 2,424,330 | Robertson | July 22, 1947 |
| 2,431,884 | Neuschotz | Dec. 2, 1947 |
| 2,501,962 | Pierce | Mar. 28, 1950 |
| 2,502,947 | Hess | Apr. 4, 1950 |
| 2,572,484 | Howle et al. | Oct. 23, 1951 |

FOREIGN PATENTS

| Number | Country | Date |
|---|---|---|
| 495,001 | Germany | Apr. 1, 1930 |

OTHER REFERENCES

Pages 380 and 381 of Trinks' Vol. I, third edition, 1934. Published by John Wiley and Sons, N. Y., N. Y.

King: Calif. Journ. of Mines and Geology, vol. 44, No. 3, July 1948. P. 252/378.